United States Patent [19]
Hattori

[11] Patent Number: 5,961,917
[45] Date of Patent: Oct. 5, 1999

[54] PROCESS FOR PRODUCING LONG CERAMIC BODY

[75] Inventor: Mitsuru Hattori, Ama-gun, Japan

[73] Assignee: NGK Insulators, Ltd., Japan

[21] Appl. No.: 09/021,703

[22] Filed: Feb. 10, 1998

[30] Foreign Application Priority Data

Feb. 18, 1997 [JP] Japan ..................................... 9-033862

[51] Int. Cl.⁶ .................................................. C04B 33/32
[52] U.S. Cl. .......................... 264/672; 264/605; 264/671; 264/673
[58] Field of Search ................................... 264/605, 671, 264/672, 673

[56] References Cited

U.S. PATENT DOCUMENTS

| | | | |
|---|---|---|---|
| 1,513,617 | 10/1924 | Litt . | |
| 2,948,949 | 8/1960 | Schuffler et al. . | |
| 3,351,690 | 11/1967 | Stover | 264/523 |
| 4,731,207 | 3/1988 | Matsumoto | 264/671 |
| 5,064,588 | 11/1991 | Misawa | 264/671 |
| 5,209,525 | 5/1993 | Ito | 285/137.1 |
| 5,336,569 | 8/1994 | Misawa et al. . | |
| 5,514,313 | 5/1996 | Yoshida | 264/671 |

FOREIGN PATENT DOCUMENTS

C 04 B 35/64  8/1995  Germany .

OTHER PUBLICATIONS

Patent Abstracts of Japan vol. 095, No. 004, May 31, 1995—& JP 07 017771 A (Hitachi Ltd), Jan. 20, 1995.

*Primary Examiner*—James Derrington
*Attorney, Agent, or Firm*—Wall Marjama Bilinski & Burr

[57] ABSTRACT

A method for producing a long ceramic body, including the steps of pre-firing a non-fired long ceramic body at a first temperature for a sufficient time to achieve a shrinkage ratio in the body of 5% to 95%, thereby forming a pre-fired ceramic body, hanging the pre-fired ceramic body in a substantially vertical direction inside a sheath while maintaining a spacing between the pre-fired ceramic body and the sheath, applying a downward load to the pre-fired ceramic body at a position proximate the bottom end thereof, and firing the pre-fired body at a second temperature for a sufficient time to sinter the pre-fired ceramic body.

13 Claims, 6 Drawing Sheets

Fig.1(a)
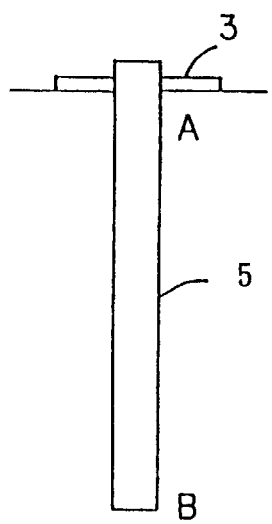
Fig.1(b)
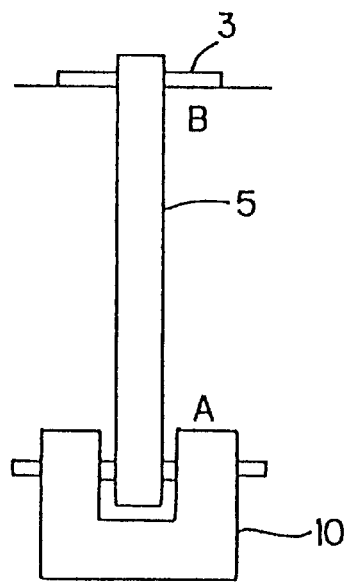
INVERSION
Fig.2(a) — Prior Art
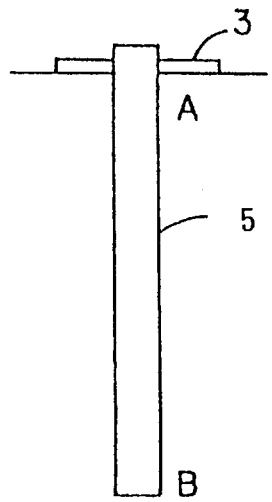
Fig.2(b) — Prior Art
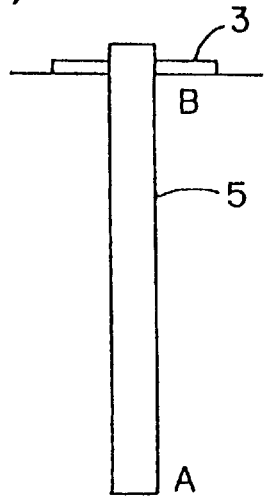
INVERSION

PROCESS FOR PRODUCING LONG CERAMIC BODY

This application is based on Japanese Patent Application No. 9-33862, filed Feb. 18, 1997, the entire content of which is incorporated herein by reference.

PROCESS FOR PRODUCING LONG CERAMIC BODY

BACKGROUND OF THE INVENTION AND RELATED ART STATEMENT

The present invention relates to a method for producing a long ceramic body, and more specifically, to a method for producing a long, tubular ceramic body used, for example, as a heat transfer tube in a shell-and-tube-type heat exchanger and the like. One example of such a heat exchanger is described in U.S. Pat. No. 5,209,525, the entirety of which is incorporated herein by reference.

Heretofore, long ceramic bodies used as heat transfer tubes in ceramic shell-and-tube-type heat exchangers and the like have been manufactured by molding material powders using various molding methods into desired long shapes, calcining the molded bodies as needed, and then heating and firing the molded bodies while suspended in a sheath in spaced arrangement with the interior surface of the sheath. However, slight differences in density within the molded body tended to cause warping in the lower portion of the body during firing.

The method disclosed in U.S. Pat. No. 5,514,313 was developed to address the warping problem, and is depicted in FIGS. 2(a) and 2(b) (the sheath is not shown). According to the disclosed method, the long ceramic body 5 is first fired at a temperature at which sintering takes place until sintering is completed, as shown in FIG. 2(a). The body 5 is then inverted and fired again at a temperature at which sintering can take place, as shown in FIG. 2(b). When the body 5 is suspended during firing as shown in FIG. 2(a), warping is inhibited in the body upper portion A, because a large downward tensile force is applied to that portion by the weight of the body itself. However, warping occurs in the body lower portion B during the firing process, because a large downward tensile force, which would otherwise inhibit warping, is absent from that portion of the body. By inverting the body 5 so that the lower, warped portion B becomes the upper portion, as shown in FIG. 2(b), and then refiring the body at a temperature at which plastic deformation takes place, the lower portion B, which is now the upper portion during the second firing, is pulled downward by the weight of the body 5 and warping is corrected in portion B. The entire content of U.S. Pat. No. 5,514,313 is incorporated herein by reference.

In recent years, it has become desirable to increase the length of heat transfer tubes in the development of higher efficiency ceramic shell-and-tube-type heat exchangers. However, as the length of the tube increases, the amount of warp over the entire length of the tube also increases. It is preferred that the straightness of the tube over its entire length not exceed 0.5 mm in order to allow easy alignment and assembly of the tubes in the supporting structures of the heat exchanger. While the prior art method described can achieve straightness of 0.5 mm or less in relatively short (e.g., aspect ratio (L/W) of less than 50) heat exchanger tubes, it can achieve straightness only as low as 1.0 mm in relatively long (e.g., L/W 50) ceramic tubes. This is unacceptable as it gives rise to alignment and assembly problems during manufacture of the heat exchanger.

Accordingly, it is necessary to develop a method for producing long ceramic bodies (e.g., L/W>50) with high shape accuracy, such as straightness, comparable to that of short ceramic bodies. Specifically, it would be desirable to achieve straightness of 0.5 mm or less along the entire length of a ceramic body having a length/width aspect ratio of at least 50.

Another problem with the conventional method described above is that the warp is corrected only by the weight of the suspended ceramic body itself. Accordingly, the degree to which the warp can be corrected varies from body to body. Moreover, it is difficult to form a group of long bodies all having the same shape, since the correction of warp in each individual body depends upon the physical characteristics of each body. That is, it is difficult to standardize the warp correction among all bodies in a group.

SUMMARY OF THE INVENTION

The present invention was developed to overcome the above-discussed problems with the prior art and it is an object of the present invention to provide a method for producing a long ceramic body with a high shape accuracy and low fluctuation in shape accuracy from body to body by better controlling the deformation of the long ceramic body during the firing process.

According to the present invention, a method for producing a long ceramic body is provided, which includes the steps of pre-firing a non-sintered long ceramic body at a first temperature for a sufficient time to achieve a remaining shrinkage ratio in the body of 5% to 95%, thereby forming a pre-fired ceramic body, hanging the pre-fired ceramic body in a substantially vertical direction inside a sheath while maintaining a spacing between the pre-fired ceramic body and the sheath, applying a downward load to the pre-fired ceramic body at a position proximate the lower end thereof, and firing the pre-fired ceramic body at a second temperature for a sufficient time to sinter the pre-fired ceramic body completely. The magnitude of the load is preferably 0.001–10 MPa and the load is preferably applied by attaching a weight to the long ceramic body at a position proximate the bottom thereof. The temperature of the firing/sintering step is preferably 800° C. or above.

As used herein, the term "non-sintered ceramic body" means a molded ceramic body (green body) or a binder-calcined ceramic body, and "pre-fired ceramic body" means a ceramic body that has been pre-fired to a predetermined degree short of the completion of sintering.

Additionally, "remaining shrinkage ratio" means a ratio between (1) the amount the pre-fired body will shrink after the pre-firing step to achieve a relative density of 100% and (2) the total amount the body will shrink during the pre-firing step and the firing/sintering step to achieve a relative density of 100%. For example, if a non-sintered ceramic body will shrink a total of 10 mm in length after both the pre-firing and firing/sintering steps to result in a sintered body having a relative density of 100%, and that body shrunk 1 mm after the pre-firing step, then the pre-fired body would be said to have a "remaining shrinkage ratio" of 90% (i.e., 9 mm/10 mm).

Further, "completion of sintering" means the point during sintering at which the ceramic body has reached 98 percent of the total amount of shrinkage that the body would experience if sintered to a relative density of 100 percent. In the example given above, the body, whose initial length was 10 mm, would be considered to be at the "completion of sintering" when the length of the body had shrunk 9.8 mm in length.

Furthermore, a "long ceramic body" means a ceramic member shaped like a rod, a tube, or combinations thereof (a shape having both rod and tubular shapes in a single member). The ceramic member can be of any cross-sectional shape (e.g., circle, oval, square, etc.).

While the present invention preferably is used to prevent/correct warp in long ceramic bodies having an aspect ratio of 50 or greater, it can also be used in the manufacture of shorter ceramic bodies where a high degree of straightness (e.g., <0.5 mm) is needed.

BRIEF DESCRIPTION OF THE DRAWINGS

FIGS. 1(a) and 1(b) are diagrams illustrating a method for producing a long ceramic body in accordance with the method of the present invention.

FIGS. 2(a) and 2(b) are diagrams illustrating a prior art method for producing a long ceramic body.

PREFERRED EMBODIMENTS OF THE INVENTION

Figure 3A:
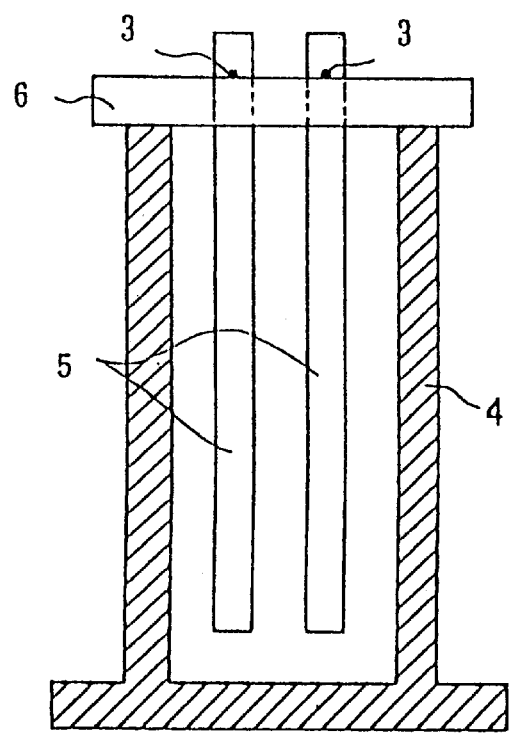
FIGS. 3(a) and 3(b) are diagrams illustrating a method for firing a long ceramic body, FIG. 3(a) being a side view showing the state of firing, and FIG. 3(b) being a top view thereof.

A ceramic long body is obtained by the following method in accordance with a preferred embodiment of the present invention. A ceramic long body in the form of a tube is formed by extrusion (although other forming methods can be used). The ceramic body, which is in a non-sintered state, is then pre-fired. The pre-firing step can be carried out while the non-sintered body is laid flat on an appropriate setter or suspended as shown in FIG. 1(a) (the sheath is not shown). After pre-firing the pre-fired ceramic body 5 is suspended as shown in FIG. 1(b) (inverted if suspended during pre-firing) and then fired to the completion of sintering while a predetermined load 10 is applied proximate the bottom end thereof.

Any warping that may be present in the ceramic body as a result of the pre-firing will be corrected during the firing/sintering step. More specifically, the pre-fired ceramic body 5 will undergo plastic deformation during the firing/sintering step, and the load 10 applied to the bottom end of the body will pull the body downwardly such that any large warp that occurred during pre-firing will be corrected.

The pre-firing step is performed for a sufficient time and at a temperature where 95% remaining shrinkage ratio is achieved to a temperature where 5% remaining shrinkage ratio is achieved. If the pre-firing temperature is below this temperature range, little or no sintering will take place and the pre-fired body will have insufficient strength and will tend to break under the force of the load applied during the firing step. Alternatively, if the pre-fired ceramic body does not break, it will likely suffer excessive elongation during the firing step, thereby adversely affecting the shape accuracy of the body. If the pre-firing temperature is above this temperature range, sintering will proceed too far during the pre-firing step, such that the remaining shrinkage ratio of the pre-fired body will be too small. Consequently, warping in the body will not be corrected effectively during the firing/sintering step.

The pre-firing temperature will vary depending upon the ceramic used to form the body, and thus the pre-firing temperature has to be selected on a material case-by-case basis. Again, however, the pre-firing temperature must be sufficient to produce a pre-fired body having a remaining shrinkage ratio of 5% to 95%. It is believed that the pre-firing step can be completed within 0.5 to 1.0 hours for most ceramic materials.

Selection of the amount of load to apply to the bottom end of the body during sintering will also depend upon the type of ceramic material being used. The load must be enough to correct warping of the body during sintering, but must not be too high to the point where the body is broken or excessively elongated/deformed during firing. For example, the long body will be excessively elongated and reduced in cross-sectional size if the applied load exceeds 10 MPa, because, during firing, the long body is again in a condition where plastic deformation takes place. If the magnitude of the load is less than 0.001 MPa, the warp of the long body cannot be corrected effectively, and desired shape accuracy cannot be achieved. The magnitude of the load preferably is between 0.001 and 1.0 MPa, more preferably between 0.001 and 0.01, and most preferably between 0.005 and 0.008.

By applying the load within a predetermined range, variation in the shape accuracy of the sintered body can be minimized, and a long ceramic body having a uniform shape accuracy can be obtained.

Although any loading method that can apply a downward load in the above predetermined range to the lower end of the long body can be used, it is preferred that a weight is attached to the long body proximate the lower end thereof to apply the desired load.

The temperature used during the firing step preferably ranges from 1300° C. to 1900° C., depending upon the temperature necessary to reach the completion of sintering. When the lower end of this range (e.g., 1300° C.–1400° C.) is used, it is preferred that a slightly larger load (e.g., 1–10 MPa) be applied during firing. While the pre-firing temperature can be the same as the firing temperature, this condition is not required. It is likely, however, that the pre-firing temperature range will be high enough at least to initiate sintering in the ceramic body.

The rate at which the temperature is increased to the pre-firing temperature is preferably as slow as possible, such as 200° C./hr or less. If the rate is too high, the body shrinks too fast, which in turn causes increased deformation and creates residual stress in the body, both of which are detrimental to strength. The rate at which the temperature is increased to the firing/sintering temperature used in the firing step is preferably the same as or lower than that used in the pre-firing step.

Figure 3B:
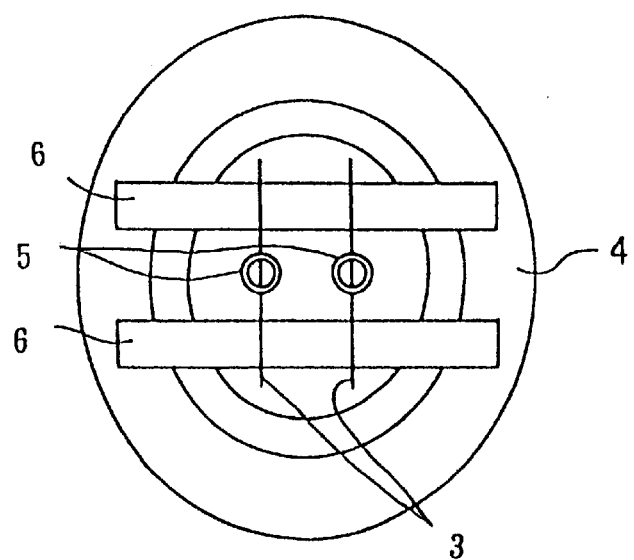

FIGS. 3(a) and 3(b) show a method for suspending the long body 5 in the sheath 4. By way of example, a through hole is made at the end of the long body 5, and both ends of a needle-like suspending pin 3 passed through the hole are suspended from an upper support 6 positioned on the sheath 4. Alternatively, a constriction could be formed on the end of the long body, and appropriate hanging means could be attached to the constriction for suspending the long body.

In the present invention, any oxide or non-oxide ceramic materials may be used as the materials for the long body, and may be selected according to the environment in which the long body will be used. For example, when used as a heat transfer tube for a ceramic shell-and-tube-type heat exchanger, the long body could be made of silicon nitride, in view of the high mechanical strength and high heat resistance of this material.

The present invention will now be described below in further detail referring to the following Examples, it being understood that these Examples are for illustrative purposes only and should not be construed to limit the present invention.

EXAMPLE 1

A mixture was formulated including 1,000 g $Si_3N_4$ powder, 10 g $Y_2O_3$ (sintering additive), 10 g MgO (sintering additive), 5 g $ZrO_2$ (sintering additive), 1 g polyvinyl alcohol (organic binder), and 1,000 g water. This mixture was ground and mixed for 4 hours in an attritor using $Si_3N_4$ balls (5 mm in diameter). The resulting finely ground mixture was dried and granulated using a spray drier, and extruded into several long tubular bodies. The extruded long bodies were dried at 110° C. for 10 hours, and then calcined to obtain non-sintered long bodies. Through holes for passing suspending pins were formed at both ends of the non-sintered long bodies.

Next, the non-sintered long bodies were placed on a SiC board, and pre-fired in nitrogen atmosphere at a pre-firing temperature of 1,100° C. and a temperature raising rate of 50° C./hr. The pre-firing time, that is the retention time at the pre-firing temperature, was 1 hour.

Next, as FIGS. 3(a) and (b) show, the pre-fired bodies were placed in a sheath 4 and fired again to the completion of sintering. More specifically, two square-pillar-shaped support bars 6 were placed substantially in parallel to each other at a predetermined distance on the upper end of self-supporting columnar sheath 4. Needle-like suspending pins 3 were passed through the holes made at the ends of the non-sintered bodies 5, and both ends of the pins 3 were placed on the two support bars 6 to hang the non-sintered bodies 5 in the sheath 4. Firing was then performed in nitrogen atmosphere at a firing temperature of 1650° C. and a temperature raising rate of 50° C./hr. The firing time, that is the retention time at the sintering temperature, was 1 hour. Ten samples were prepared in this manner for each of Examples 1-1 to 1-8, except that the load applied during sintering was increased as follows for Example 1-1 to Example 1-8: 0.001, 0.002, 0.003, 0.004, 0.005, 0.006, 0.007, 0.008 MPa. The load is not depicted in FIGS. 3(a) and 3(b), although it was applied as in FIG. 1(b).

Each of the tubular long bodies produced above was targeted to have an outer diameter of about 12 mm, an inner diameter of about 9 mm, and a length of about 1000 mm. The straightness, roundness, and actual outer diameter of each sample were measured, and the mean values and standard deviations of each value are shown in Table 1. The straightness and roundness of each sample were measured by known methods using a device called "Laser Scan Diameter LS-3030" supplied by Keyence.

Figure 4:
FIG. 4 is a diagram illustrating straightness of a long ceramic body.
Figure 5A:
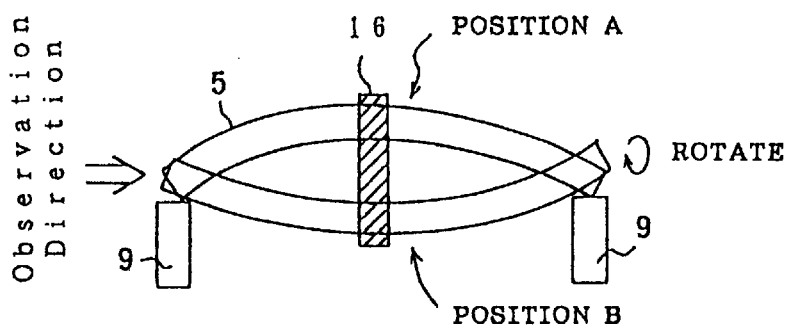
FIGS. 5(a) to 5(d) are diagrams illustrating a method for measuring straightness of a long ceramic body.
Figure 5B:
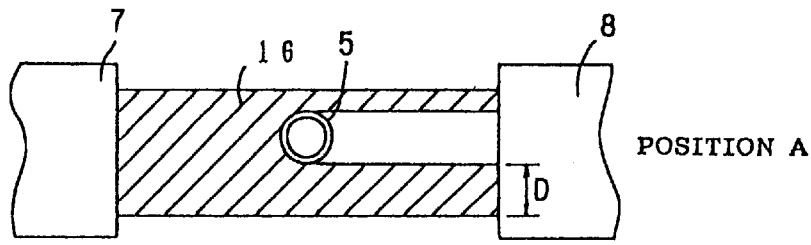
Figure 5C:
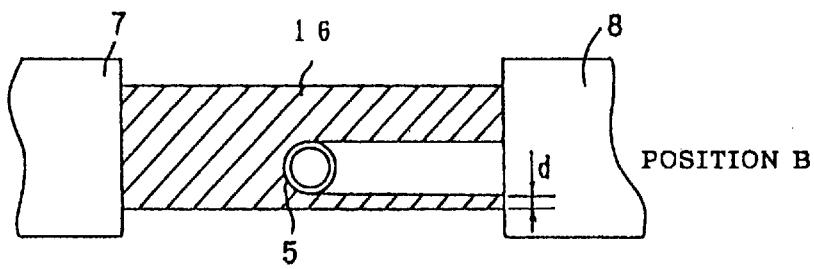
Figure 5D:
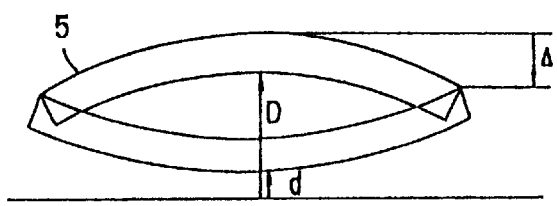

The term "straightness" used herein means the bending amount Δ of the long body 5 after sintering as shown in FIG. 4. Specifically, as FIGS. 5(a)–(d) show, straightness was calculated using the equation: $\Delta=(D-d)/2$, where D and d respectively are the distances from the lower end of the laser beam 16 where the deformed point of the long body was highest (position A) and lowest (position B). These distances were obtained by rotating the long body 5 placed on a support table 9 between an emitting part 7 and a receiving part 8 of laser beam 16.

The remaining shrinkage ratios and Knoop hardnesses (300 g load) of each Example are also described in Table 1. Shrinkage was determined in the same manner as described in U.S. Pat. No. 5,514,313.

EXAMPLE 2

Ten tubular ceramic bodies were produced for each of Examples 2-1~2-8 under the same conditions as in Example 1, except that the pre-firing temperature was 1300° C. and the magnitudes of loads applied to the long bodies at the lower ends thereof during sintering were 0.003, 0.004, 0.005, 0.006, 0.007, 0.008, 0.009, 0.01 MPa in order from Examples 2-1 to Example 2-8. As in Example 1, the straightness, roundness, and outer diameter of each sample were measured, and the mean values and standard deviations of each value were obtained. The results are shown in Table 1 along with remaining shrinkage ratios and Knoop hardnesses (300 g load) for each Example.

EXAMPLE 3

Ten tubular ceramic bodies were produced for each of Examples 3-1~3-6 under the same conditions as in Example 1, except that the pre-firing temperature was 1500° C. and the magnitudes of loads applied to the long bodies at the lower ends thereof during sintering were 0.005, 0.006, 0.007, 0.008, 0.009, 0.01 MPa in order from Examples 3-1~3-6. As in Example 1, the straightness, roundness, and outer diameter of each sample were measured, and the mean values and standard deviations of each value were obtained. The results are shown in Table 2 along with remaining shrinkage ratios and Knoop hardnesses (300 g load) for each Example.

COMPARATIVE EXAMPLES 1-1~1-10

Ten tubular ceramic bodies were produced for each of Comparative Examples 1-1~1-10 under the same conditions as in Example 1, except that the pre-firing temperature was 900° C. and the magnitudes of loads applied to the long bodies at the lower ends thereof during sintering were 0.001, 0.002, 0.003, 0.004, 0.005, 0.006, 0.007, 0.008, 0.009, 0.01 MPa in order from Comparative Examples 1-1 to 1-10. The results are show in Table 2 along with remaining shrinkage ratios and Knoop hardnesses (300 g load) for each Comparative Example.

COMPARATIVE EXAMPLES 2-1~2-2

Ten long ceramic bodies were produced for each of Comparative Examples 2-1~2-2 under the same conditions as in Example 1, except that the pre-firing temperature was 1100° C. and the magnitudes of loads applied to the long bodies at the lower ends thereof during sintering were 0.009 and 0.01 MPa in order from Comparative Example 2-1 to 2-2. The results are shown in Table 2 along with remaining shrinkage ratios and Knoop hardnesses (300 g load) for each Comparative Example.

COMPARATIVE EXAMPLES 3-1~3-2

Ten long ceramic bodies were produced for each of Comparative Examples 3-1~3-2 under the same conditions as in Example 1 except that the pre-firing temperature was 1300° C. and the magnitudes of loads applied to the long bodies at the lower ends thereof during sintering were 0.001 and 0.002 MPa in order from Comparative Example 3-1 to 3-2. As in Example 1, the straightness, roundness and outer diameter of each sample were measured, and the mean values and standard deviations of each value were obtained. The results are shown in Table 3 along with remaining shrinkage ratios and Knoop hardnesses (300 g load) for each Comparative Example.

COMPARATIVE EXAMPLES 4-1~4-4

Ten long ceramic bodies were produced for each of Comparative Examples 4-1~4-4 under the same conditions as in Example 1, except that the pre-firing temperature was 1500° C. and the magnitudes of loads applied to the long bodies at the lower ends thereof during sintering were 0.001, 0.002, 0.003 and 0.004 MPa in order from Comparative Examples 4-1 to 4-4. As in Example 1, the straightness, roundness and outer diameter of each sample were measured, and the mean values and standard deviations of each value were obtained. The results are shown in Table 3 along with remaining shrinkage ratios and Knoop hardnesses (300 g load) for each Comparative Example.

COMPARATIVE EXAMPLE 5-1~5-10

Ten long ceramic bodies were produced for each of Comparative Example 5-1~5-10 under the same conditions as in Example 1, except that the pre-firing temperature was 1650° C. and the magnitudes of loads applied to the long bodies at the lower ends thereof during sintering were 0.001, 0.002, 0.003, 0.004, 0.005, 0.006, 0.007, 0.008, 0.009 and 0.01 MPa in order from Comparative Example 5-1 to 5-10. As in Example 1, the straightness, roundness and outer diameter of each sample were measured, and the mean values and standard deviations of each value were obtained. The results are shown in Table 3 along with remaining shrinkage ratios and Knoop hardnesses (300 g load) for each Comparative Example.

COMPARATIVE EXAMPLE 6

Ten long ceramic bodies were produced for Comparative Example 6 under the same conditions as in Example 1 except that as FIG. 2(a) shows, the non-sintered body was suspended in a sheath 4 during pre-firing at 1650° C., and thereafter inverted upside down and sintered at 1650° C. without any load applied to the long body at the lower end thereof during sintering. As in Example 1, the straightness, roundness and outer diameter of each sample were measured, and the mean values and standard deviations of each value were obtained. The results are shown in Table 3 along with remaining shrinkage ratios and Knoop hardnesses (300 g load) for this Comparative Example.

Figure 6:
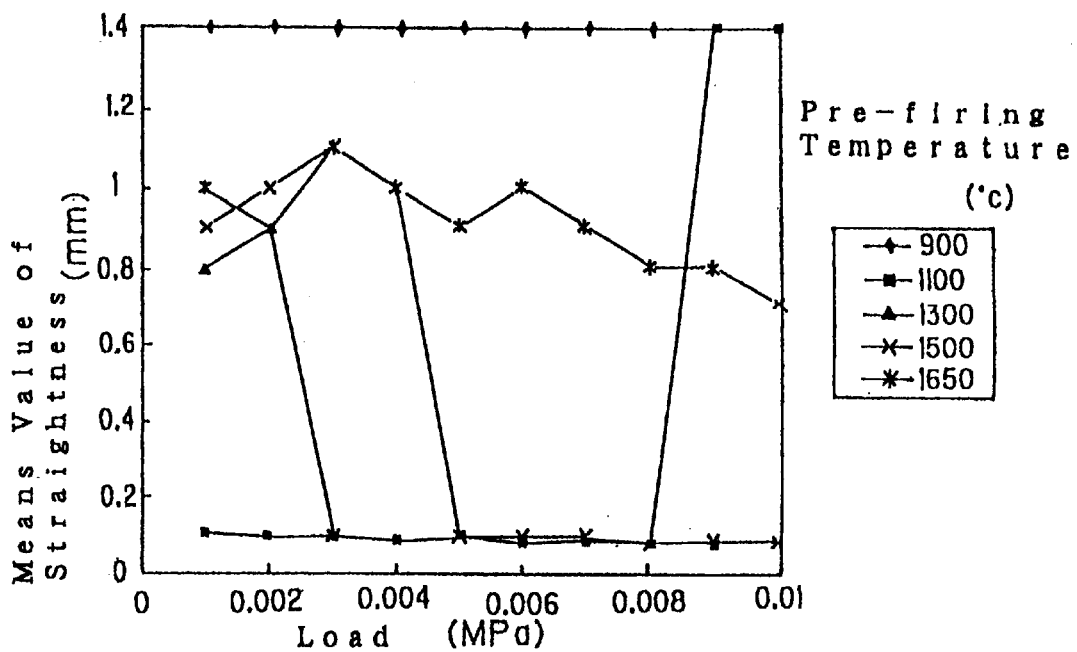
FIG. 6 is a graph showing the mean values of straightness plotted versus loads at various pre-firing temperatures.
Figure 7:
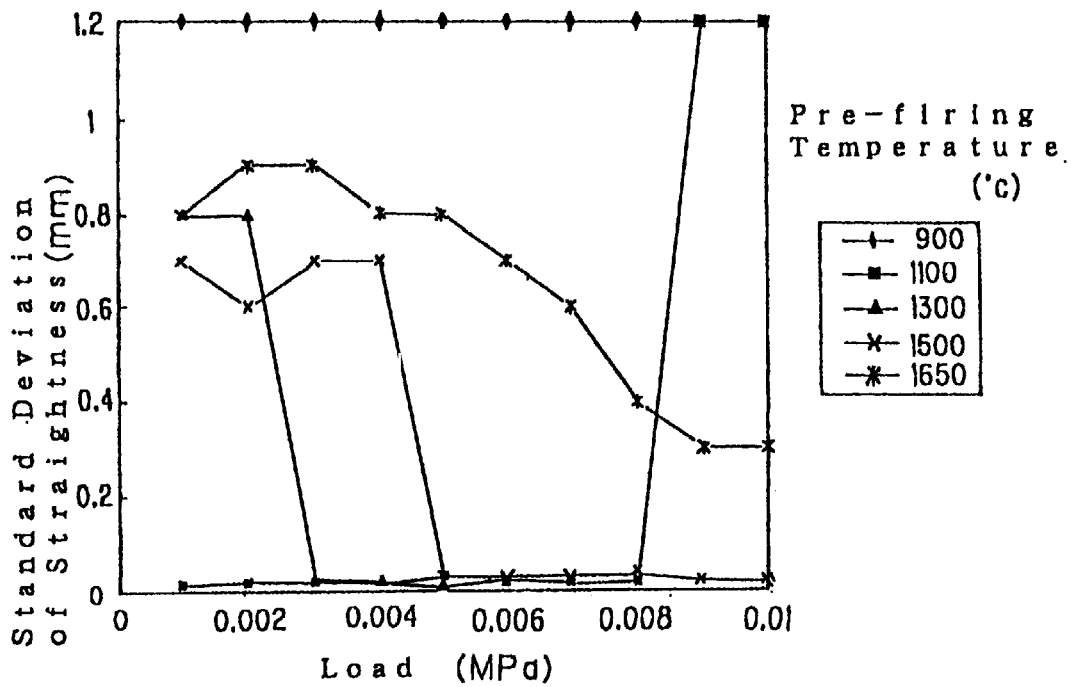
FIG. 7 is a graph showing the standard deviations of straightness plotted versus loads at various pre-firing temperatures.
Figure 8:
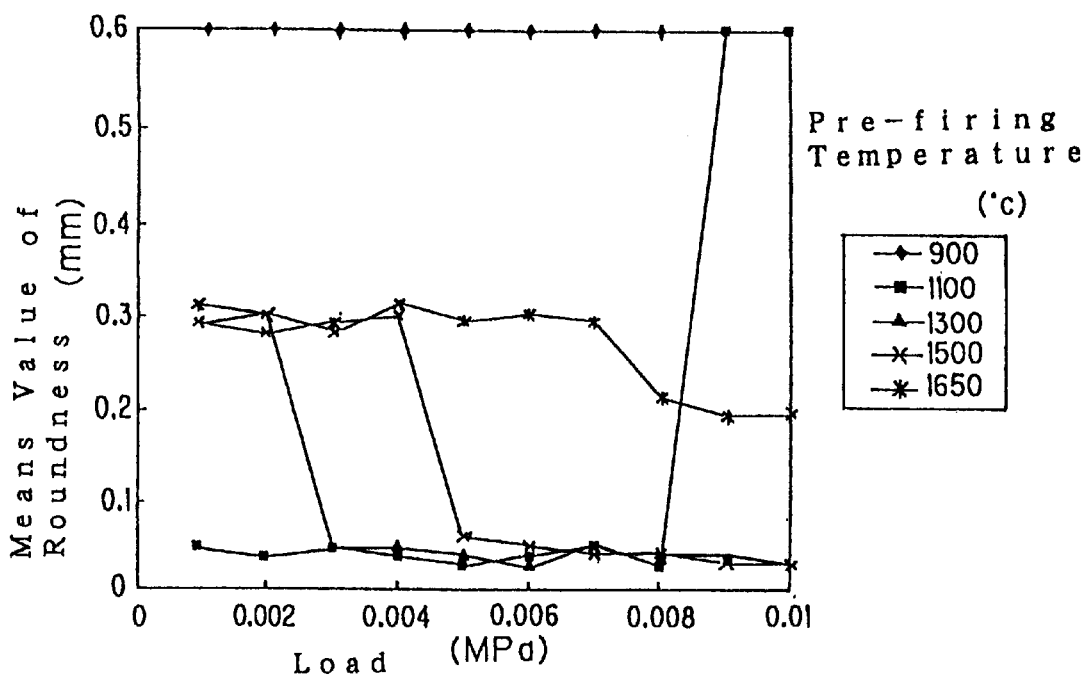
FIG. 8 is a graph showing the mean values of roundness plotted versus loads at various pre-firing temperatures.
Figure 9:
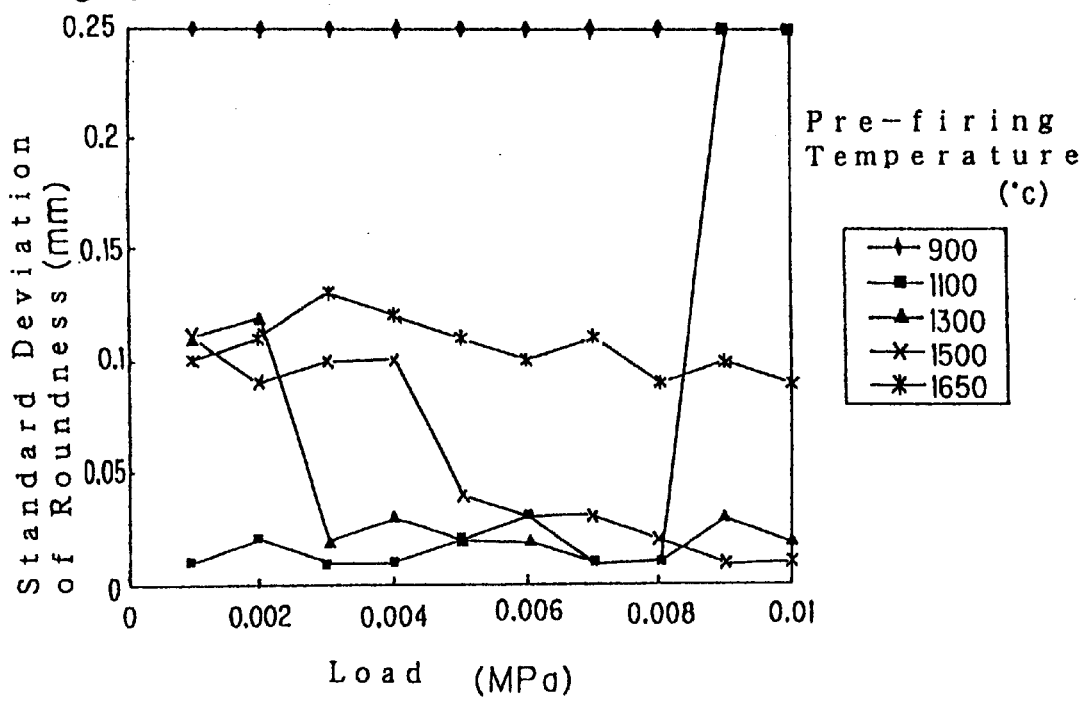
FIG. 9 is a graph showing the standard deviations of roundness plotted versus pre-firing temperatures.
Figure 10:
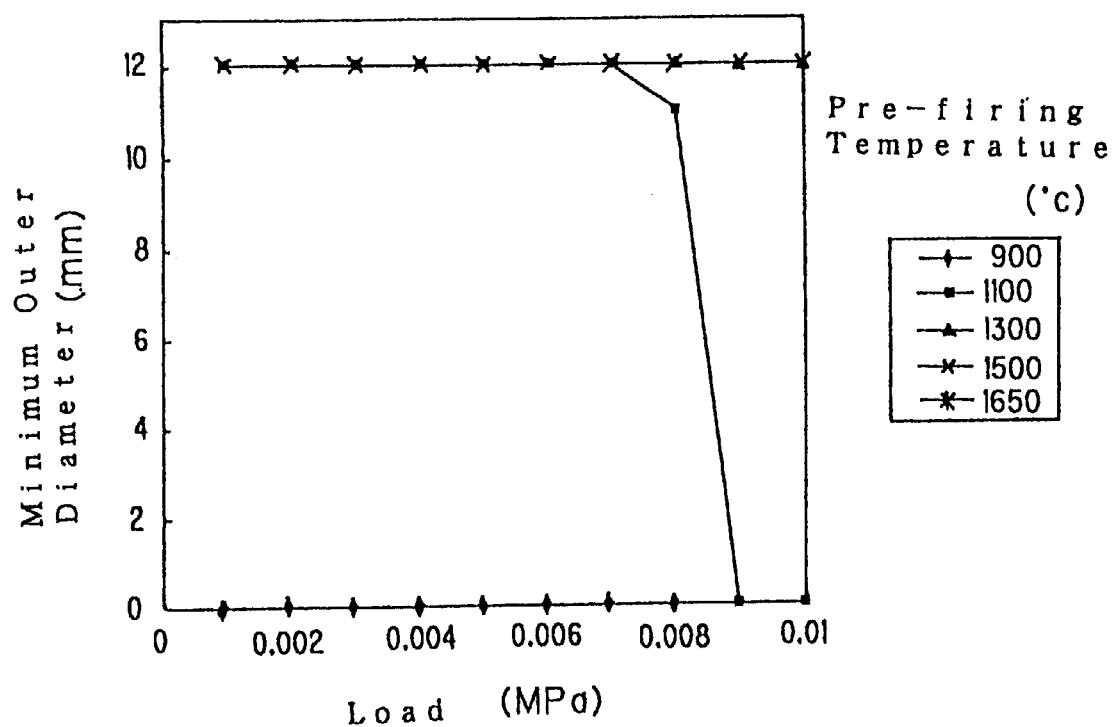
FIG. 10 is graph showing the mean values of the smallest outer diameters plotted versus loads at various pre-firing temperatures.

A graph showing the mean values of straightness plotted versus applied load at each pre-firing temperature is shown in FIG. 6, and a graph showing the standard deviations of straightness plotted versus load at each pre-firing temperature is shown in FIG. 7. A graph showing the mean values of roundness plotted versus load at each pre-firing temperature is shown in FIG. 8, and a graph showing the standard deviations of the roundness plotted versus load at each pre-firing temperature is shown in FIG. 9. A graph showing the mean values of the smallest outer diameters plotted versus load at each pre-firing temperature is shown in FIG. 10.

It can be seen from Table 1–3 and FIG. 6 that the mean values of straightness of all tubular ceramic bodies from Examples 1-1 to 2-8, wherein the pre-firing temperature was a temperature at which 5%–95% remaining shrinkage ratio was produced, and loads within a range between 0.005 and 0.008 MPa were applied during sintering, was 0.1 mm or less. Conversely, all tubular ceramic bodies from Comparative Example 6, to which no loads were applied, and in Comparative Examples 1 and 5, wherein the pre-firing temperature was outside the temperature in which 5%–95% remaining shrinkage ratio was produced, were broken, or if not broken, had a mean value of straightness of around 1.0 mm and poor shape accuracy. All the tubular bodies from Comparative Example 2 were broken during firing, because the loads applied during firing were above 0.008 MPa. All the tubular bodies from Comparative Example 3 had poor shape accuracy, because the loads applied during firing were less than 0.003 MPa. All the tubular bodies from Comparative Example 2 had poor shape accuracy, because the loads applied during firing were less than 0.005 MPa.

For roundness, it can be seen from Tables 1-2 and FIG. 8 that the mean values of all tubular ceramic bodies from Examples 1-1 to 3-6 were 0.06 mm or less, whereas tubular ceramic bodies from Comparative Examples 1-1 to 6 were broken, or if not broken, had mean values of roundness of about 0.2 or more. The improvement of roundness by the application of loads during firing is considered to be the result of correction of deformation-induced collapse of the cross-sectional shape of the body during pre-firing.

The fluctuation of straightness and roundness in Examples 1-1 to 3-6 both were 0.04 or less, shown in standard deviations, whereas those in the Comparative Examples were 0.3 or more and 0.09 or more, respectively.

According to the method of the present invention, since the non-sintered ceramic long body is pre-fired at predetermined temperature and then fired/sintered in a suspended state while a load of a predetermined magnitude is applied to the pre-fired long body proximate the lower end thereof, any warp created in the long body during pre-firing can be corrected effectively, the fluctuation of shape accuracy of the long body after sintering can be minimized, and a long ceramic body of uniform and high shape accuracy can be obtained. Therefore, the method of the present invention can be used suitably, for example, to produce longer and straighter heat transfer tubes for higher efficiency shell-and-tube-type heat exchangers and the like.

While the present invention has been described with reference to particular preferred embodiments, it will be understood by those skilled in the art that various modifications and the like could be made thereto without departing from the spirit and scope of the invention as defined in the following claims.

TABLE 1

| | Pre-firing Temperature (° C.) | Firing Temperature (° C.) | Load (MPa) | Shape Accuracy | | Minimum Outer Diameter (mm) | Remaining Shrinkage Ratio of Pre-Fired Body (%) | Knoop Hardness of Pre-Fired Body (GPa) |
|---|---|---|---|---|---|---|---|---|
| | | | | Straightness (mm) (standard deviation) | Roundness (mm) (standard deviation) | | | |
| Example 1 | | | | | | | | |
| 1-1 | 1100 | 1650 | 0.001 | 0.1 (0.01) | 0.05 (0.01) | 12.00 | 95 | 0.5 |
| 1-2 | 1100 | 1650 | 0.002 | 0.09 (0.02) | 0.04 (0.02) | 12.01 | 95 | 0.5 |
| 1-3 | 1100 | 1650 | 0.003 | 0.09 (0.02) | 0.05 (0.01) | 12.03 | 95 | 0.5 |
| 1-4 | 1100 | 1650 | 0.004 | 0.08 (0.01) | 0.04 (0.01) | 12.00 | 95 | 0.5 |
| 1-5 | 1100 | 1650 | 0.005 | 0.09 (0.03) | 0.03 (0.02) | 12.00 | 95 | 0.5 |
| 1-6 | 1100 | 1650 | 0.006 | 0.07 (0.01) | 0.04 (0.03) | 12.01 | 95 | 0.5 |
| 1-7 | 1100 | 1650 | 0.007 | 0.08 (0.01) | 0.05 (0.01) | 12.01 | 95 | 0.5 |
| 1-8 | 1100 | 1650 | 0.008 | 0.07 (0.02) | 0.03 (0.01) | 12.00 | 95 | 0.5 |
| Example 2 | | | | | | | | |
| 2-1 | 1300 | 1650 | 0.003 | 0.1 (0.03) | 0.05 (0.02) | 12.01 | 55 | 5.0 |
| 2-2 | 1300 | 1650 | 0.004 | 0.08 (0.02) | 0.05 (0.03) | 12.01 | 55 | 5.0 |
| 2-3 | 1300 | 1650 | 0.005 | 0.09 (0.01) | 0.04 (0.02) | 12.02 | 55 | 5.0 |
| 2-4 | 1300 | 1650 | 0.006 | 0.09 (0.02) | 0.03 (0.02) | 12.03 | 55 | 5.0 |
| 2-5 | 1300 | 1650 | 0.007 | 0.09 (0.02) | 0.05 (0.01) | 12.01 | 55 | 5.0 |
| 2-6 | 1300 | 1650 | 0.008 | 0.08 (0.03) | 0.04 (0.01) | 12.01 | 55 | 5.0 |
| 2-7 | 1300 | 1650 | 0.009 | 0.07 (0.02) | 0.04 (0.03) | 12.00 | 55 | 5.0 |
| 2-8 | 1300 | 1650 | 0.010 | 0.08 (0.01) | 0.03 (0.02) | 12.00 | 55 | 5.0 |

TABLE 2

| | Pre-firing Temperature (° C.) | Firing Temperature (° C.) | Load (MPa) | Shape Accuracy | | Minimum Outer Diameter (mm) | Remaining Shrinkage Ratio of Pre-Fired Body (%) | Knoop Hardness of Pre-Fired Body (GPa) |
|---|---|---|---|---|---|---|---|---|
| | | | | Straightness (mm) (standard deviation) | Roundness (mm) (standard deviation) | | | |
| Example 3 | | | | | | | | |
| 3-1 | 1500 | 1650 | 0.005 | 0.09 (0.02) | 0.06 (0.04) | 12.02 | 5 | 14 |
| 3-2 | 1500 | 1650 | 0.006 | 0.09 (0.03) | 0.05 (0.03) | 12.01 | 5 | 14 |
| 3-3 | 1500 | 1650 | 0.007 | 0.09 (0.03) | 0.04 (0.03) | 12.00 | 5 | 14 |
| 3-4 | 1500 | 1650 | 0.008 | 0.07 (0.04) | 0.04 (0.02) | 12.00 | 5 | 14 |
| 3-5 | 1500 | 1650 | 0.009 | 0.08 (0.02) | 0.03 (0.01) | 12.01 | 5 | 14 |
| 3-6 | 1500 | 1650 | 0.010 | 0.07 (0.02) | 0.03 (0.01) | 12.00 | 5 | 14 |
| Comparative Examples | | | | | | | | |
| 1-1 | 900 | 1650 | 0.001 | BROKEN DURING FIRING STEP | | | 100 | 0.1 |
| 1-2 | 900 | 1650 | 0.002 | BROKEN DURING FIRING STEP | | | 100 | 0.1 |
| 1-3 | 900 | 1650 | 0.003 | BROKEN DURING FIRING STEP | | | 100 | 0.1 |
| 1-4 | 900 | 1650 | 0.004 | BROKEN DURING FIRING STEP | | | 100 | 0.1 |
| 1-5 | 900 | 1650 | 0.005 | BROKEN DURING FIRING STEP | | | 100 | 0.1 |
| 1-6 | 900 | 1650 | 0.006 | BROKEN DURING FIRING STEP | | | 100 | 0.1 |
| 1-7 | 900 | 1650 | 0.007 | BROKEN DURING FIRING STEP | | | 100 | 0.1 |
| 1-8 | 900 | 1650 | 0.008 | BROKEN DURING FIRING STEP | | | 100 | 0.1 |
| 1-9 | 900 | 1650 | 0.009 | BROKEN DURING FIRING STEP | | | 100 | 0.1 |
| 1-10 | 900 | 1650 | 0.010 | BROKEN DURING FIRING STEP | | | 100 | 0.1 |
| 2-1 | 1100 | 1650 | 0.009 | BROKEN DURING FIRING STEP | | | 95 | 0.5 |
| 2-2 | 1100 | 1650 | 0.010 | BROKEN DURING FIRING STEP | | | 95 | 0.5 |

TABLE 3

| | Pre-firing Temperature (° C.) | Firing Temperature (° C.) | Load (MPa) | Shape Accuracy | | Minimum Outer Diameter (mm) | Remaining Shrinkage Ratio of Pre-Fired Body (%) | Knoop Hardness of Pre-Fired Body (GPa) |
|---|---|---|---|---|---|---|---|---|
| | | | | Straightness (mm) (standard deviation) | Roundness (mm) (standard deviation) | | | |
| Comparative Examples | | | | | | | | |
| 3-1 | 1300 | 1650 | 0.001 | 0.8 (0.8) | 0.29 (0.11) | 12.00 | 55 | 5 |

TABLE 3-continued

|  | Pre-firing Temperature (° C.) | Firing Temperature (° C.) | Load (MPa) | Shape Accuracy | | Minimum Outer Diameter (mm) | Remaining Shrinkage Ratio of Pre-Fired Body (%) | Knoop Hardness of Pre-Fired Body (GPa) |
|---|---|---|---|---|---|---|---|---|
|  |  |  |  | Straightness (mm) (standard deviation) | Roundness (mm) (standard deviation) |  |  |  |
| 3-2 | 1300 | 1650 | 0.002 | 0.9 (0.8) | 0.3 (0.12) | 12.00 | 55 | 5 |
| 4-1 | 1500 | 1650 | 0.001 | 0.9 (0.7) | 0.29 (0.11) | 12.00 | 5 | 14 |
| 4-2 | 1500 | 1650 | 0.002 | 1.0 (0.6) | 0.28 (0.09) | 12.01 | 5 | 14 |
| 4-3 | 1500 | 1650 | 0.003 | 1.1 (0.7) | 0.29 (0.1) | 12.03 | 5 | 14 |
| 4-4 | 1500 | 1650 | 0.004 | 1.0 (0.7) | 0.3 (0.1) | 12.01 | 5 | 14 |
| 5-1 | 1650 | 1650 | 0.001 | 1.0 (0.08) | 0.31 (0.1) | 12.01 | 0 | 16 |
| 5-2 | 1650 | 1650 | 0.002 | 0.9 (0.9) | 0.3 (0.11) | 12.00 | 0 | 16 |
| 5-3 | 1650 | 1650 | 0.003 | 1.1 (0.9) | 0.28 (0.13) | 12.03 | 0 | 16 |
| 5-4 | 1650 | 1650 | 0.004 | 1.0 (0.8) | 0.31 (0.12) | 12.02 | 0 | 16 |
| 5-5 | 1650 | 1650 | 0.005 | 0.9 (0.8) | 0.29 (0.11) | 12.01 | 0 | 16 |
| 5-6 | 1650 | 1650 | 0.006 | 1.0 (0.7) | 0.3 (0.1) | 12.02 | 0 | 16 |
| 5-7 | 1650 | 1650 | 0.007 | 0.9 (0.6) | 0.29 (0.11) | 12.01 | 0 | 16 |
| 5-8 | 1650 | 1650 | 0.008 | 0.8 (0.4) | 0.21 (0.09) | 12.02 | 0 | 16 |
| 5-9 | 1650 | 1650 | 0.009 | 0.08 (0.3) | 0.19 (0.1) | 12.01 | 0 | 16 |
| 5-10 | 1650 | 1650 | 0.010 | 0.7 (0.3) | 0.19 (0.09) | 12.02 | 0 | 16 |
| 6 | 1650 | 1650 | 0 | 1.0 (0.7) | 0.33 (0.12) | 12.01 | 0 | 16 |

What is claimed is:

1. A method for producing a long ceramic body, comprising the steps of:
   pre-firing a non-fired long ceramic body at a first temperature for a sufficient time to achieve a remaining shrinkage ratio in the body of 5% to 95%, thereby forming a pre-fired ceramic body;
   hanging the pre-fired ceramic body in a substantially vertical direction inside a sheath while maintaining a spacing between the pre-fired ceramic body and the sheath;
   applying a downward load to the pre-fired ceramic body at a position proximate the lower end thereof; and
   firing the pre-fired body at a second temperature for a sufficient time to sinter the pre-fired ceramic body.

2. The method of claim 1, wherein the magnitude of the load ranges from 0.001 to 10 MPa.

3. The method of claim 1, wherein the load is applied to the pre-fired ceramic body by hanging a weight from the body proximate a lower end thereof.

4. The method of claim 1, wherein the temperature of the firing step is at least 800° C.

5. The method of claim 2, wherein the temperature of the firing step is at least 800° C.

6. The method of claim 1, wherein the long ceramic body has an aspect ratio of length to width of at least 50.

7. A method for producing a long ceramic body, comprising the steps of:
   pre-firing a non-fired long ceramic body at a first temperature for a sufficient time to achieve a remaining shrinkage ratio in the body of 5% to 95%, thereby forming a pre-fired ceramic body;
   hanging the pre-fired ceramic body in a substantially vertical direction inside a sheath while maintaining a spacing between the pre-fired ceramic body and the sheath;
   applying a downward load ranging from 0.005 to 0.008 MPa to the pre-fired ceramic body at a position proximate the lower end thereof; and
   firing the pre-fired ceramic body at a second temperature for a sufficient time to sinter the pre-fired ceramic body.

8. The method of claim 7, wherein the load is applied to the pre-fired ceramic body by hanging a weight from the body proximate a lower end thereof.

9. The method of claim 7, wherein the temperature of the firing step is at least 800° C.

10. The method of claim 7, wherein the long ceramic body has an aspect ratio of length to width of at least 50.

11. A method for producing a long ceramic body, comprising the steps of:
   pre-firing a non-fired long ceramic body at a first temperature for a sufficient time to achieve a remaining shrinkage ratio in the body of 5% to 95%, thereby forming a pre-fired ceramic body;
   hanging the pre-fired ceramic body in a substantially vertical direction inside a sheath while maintaining a spacing between the pre-fired ceramic body and the sheath;
   applying a downward load to the pre-fired ceramic body at a position proximate the bottom end thereof; and
   firing the pre-fired ceramic body at a second temperature for a sufficient time to sinter the pre-fired ceramic body, thereby forming a sintered ceramic body;
   whereby the sintered ceramic body has a straightness over its entire length of 0.1 mm or less.

12. The method of claim 11, wherein the load applied to the pre-fired ceramic body ranges from 0.005 to 0.008 MPa.

13. The method of claim 11, wherein the sintered ceramic body has an aspect ratio of length to width of at least 50.

* * * * *